United States Patent [19]
Lee

[11] Patent Number: 5,947,607
[45] Date of Patent: Sep. 7, 1999

[54] FLUID BEARING APPARATUS HAVING A THRUST BEARING MOUNTED AT BOTH ENDS OF THE ROTARY SHAFT

[75] Inventor: Chang-woo Lee, Kyonggi-do, Rep. of Korea

[73] Assignee: Samsung Electronics Co., Ltd., Kyungki-Do, Rep. of Korea

[21] Appl. No.: 08/974,192

[22] Filed: Nov. 19, 1997

[30] Foreign Application Priority Data

Nov. 25, 1996 [KR] Rep. of Korea ................... 96-57178

[51] Int. Cl.[6] .................. F16C 32/06; G11B 25/02
[52] U.S. Cl. ...................... 384/107; 369/269; 384/112
[58] Field of Search .................. 369/269; 360/98.07, 360/99.04, 99.08; 384/100, 105, 107, 112, 121–123

[56] References Cited

U.S. PATENT DOCUMENTS 4,859,088  8/1989  Fer ......................................... 384/371
5,141,338  8/1992  Asada et al. ............................ 384/114
5,270,737  12/1993 Nakasugi et al. ...................... 384/107
5,559,382  9/1996  Oku et al. ................................ 310/90

Primary Examiner—George J. Letscher
Attorney, Agent, or Firm—Sughrue, Mion, Zinn, Macpeak & Seas, PLLC

[57] ABSTRACT

A fluid bearing in which a thrust bearing is mounted at both ends of a rotary shaft to minimize movement and oscillation of the rotary shaft regardless of a thrust load. The fluid bearing apparatus includes a pair of sleeves respectively mounted into one end of a pair of bearing brackets, a rotary shaft inserted into through holes of the respective sleeves, having a second kinetic pressure generating groove on a circumferential side opposite to the inside of the respective through holes, a pair of thrust bearings mounted into the other end of the bearing brackets, and a first kinetic pressure generating groove formed between any one of the thrust bearings and a section of the rotary shaft.

7 Claims, 1 Drawing Sheet

FLUID BEARING APPARATUS HAVING A THRUST BEARING MOUNTED AT BOTH ENDS OF THE ROTARY SHAFT

BACKGROUND OF THE INVENTION

1. Field of the Invention

The present invention relates to a fluid bearing, and more particularly to a fluid bearing in which a thrust bearing is mounted at both ends of a rotary shaft to minimize movement and oscillation of the rotary shaft regardless of a thrust load.

2. Description of the Related Art

Recently, with improvements in the information and multimedia industries, there has been a trend to advance the technologies of computer systems, cassette tape recorders, camcorders, and the like. In particular, a hard disk driving gear has been developed, which acts as an auxiliary memory of computer systems and has an extremely fine clearance between a rotary disk and a head which detects a sector of a rotary disk. For this reason, oscillation of a rotary shaft in the hard disk driving gear may be fatal to the rotary disk in which a variety of important data are stored. Therefore, the hard disk driving gear requires high accuracy with minimum oscillation of the shaft. In this respect, a bearing in the hard disk driving gear, which is capable of rotating relative to the shaft at high accuracy is desired. A fluid bearing has been particularly used, which minimizes movement and oscillation of the shaft even if the shaft rotates at high speed.

However, in the conventional fluid bearing apparatus, in order to avoid oscillation or movement of the rotary shaft, a fluid bearing is provided at only one end of the shaft to support a vertical thrust load. As a result, the conventional fluid bearing apparatus has several problems in the case that the shaft does not support the vertical thrust load.

For example, in a horizontal hard disk the apparatus is mounted in the vertical direction and in a driving gear, such as a camcorder or a small sized tape recorder, the thrust load of the rotary shaft is freely varied from the vertical direction to the horizontal direction or from the horizontal direction to the vertical direction. In these cases, the load of the rotary shaft is varied to move the rotary shaft in a vertical direction or a horizontal direction so that the rotary body mounted in the rotary shaft moves. As a result, in the driving gear such as the hard disk which requires high accuracy, there results in fatal problems that the rotary disk is scratched or damaged by contact between the rotary disk and the head which moves separated from the rotary disk at a fine interval.

SUMMARY OF THE INVENTION

Accordingly, the present invention is directed to a fluid bearing apparatus that substantially obviates one or more of the problems due to the limitations and disadvantages of the related art.

An object of the present invention is to provide a fluid bearing apparatus capable of stably rotating a rotary shaft regardless of a load of a thrust bearing. Another object of the present invention is to provide a fluid bearing apparatus capable of stably rotating a rotary shaft even if the rotary shaft moves in the course of rotation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fluid bearing apparatus according to the present invention includes a pair of sleeves respectively mounted into one end of a pair of bearing brackets, a rotary shaft inserted into through holes of the respective sleeves, having a second kinetic pressure generating groove on a circumferential side opposite to the inside of the respective through holes, a pair of thrust bearings mounted into the other end of the bearing brackets, and a first kinetic pressure generating groove formed between any one of the thrust bearings and a section of the rotary shaft.

In the preferred embodiment of the present invention, the first kinetic pressure generating groove has a spiral shape of which area is gradually reduced as it extends from an edge portion to a center portion. The first kinetic pressure generating groove is formed on either a surface of a pair of the thrust bearings or the section of the rotary shaft. Furthermore, the first kinetic pressure generating groove is formed at either both sides of the surface of a pair of the thrust bearings or both sides of the section of the rotary shaft.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is included to provide a further understanding of the invention and is incorporated in and constitutes a part of this specification, illustrates the preferred embodiment of the invention and together with the description serve to explain the principles of the invention.

In the drawings.

DETAILED DESCRIPTION OF THE PREFERRED EMBODIMENTS

Figure 1:
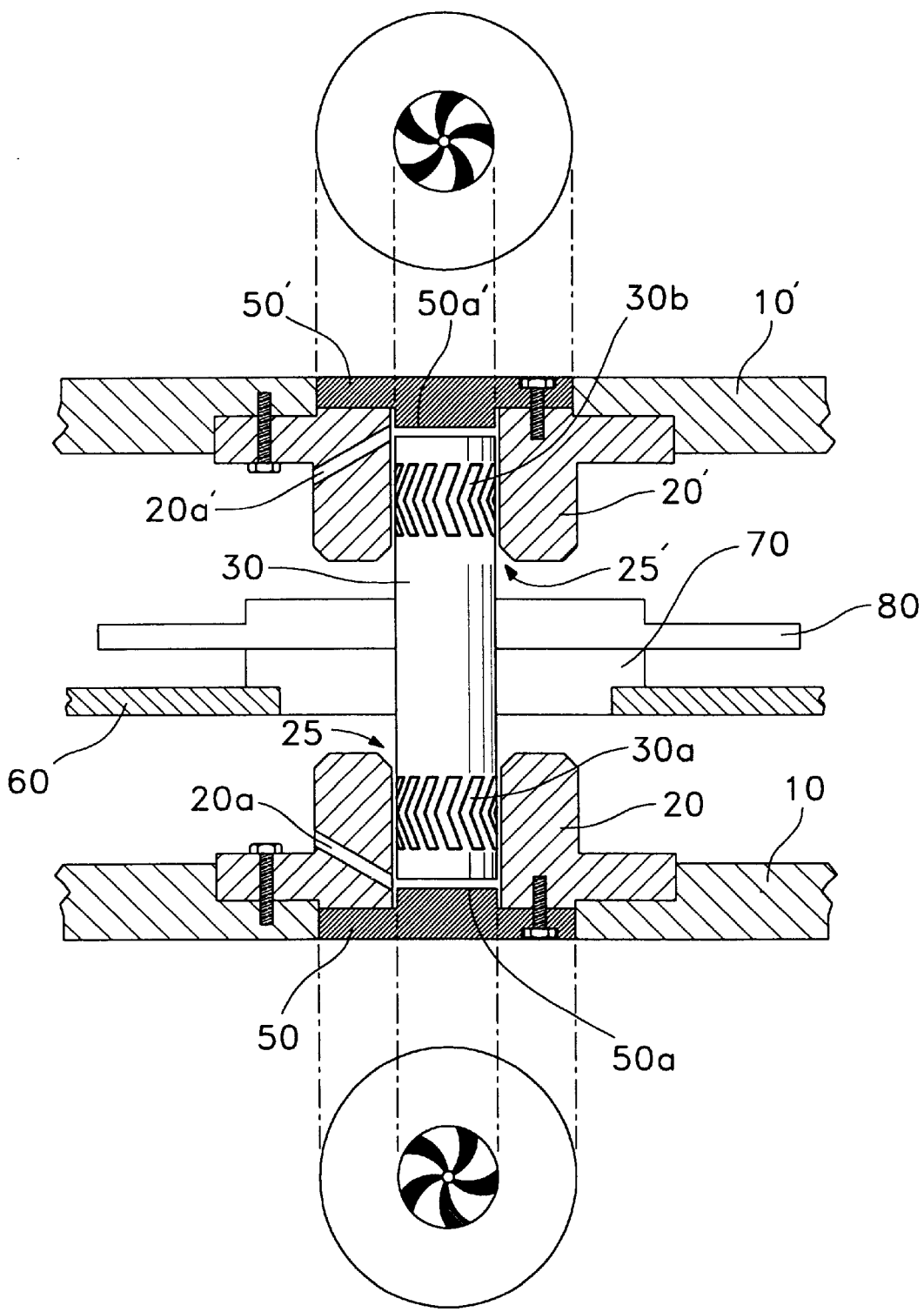
FIG. 1 is a sectional view illustrating a fluid bearing according to the present invention which is applied to a main spindle portion of a hard disk.

Reference will now be made in detail to the preferred embodiments of the present invention, examples of which are illustrated in the accompanying drawing.

Referring to FIG. 1, a lower sleeve 20 is inserted into one side of a lower bearing bracket 10 in a hard disk and fixably fastened with the lower bearing bracket 10 by means of a clamp screw or the like. A through hole 25 is formed in the lower sleeve 20 and connected to an air vent 20a. A lower thrust bearing 50 is inserted into the other side of the lower bearing bracket 10 and fixably fastened with the lower sleeve 20 by means of a clamp screw or the like. In this embodiment, a first kinetic pressure generating groove 50a is formed on a surface of the lower thrust bearing 50. However, the first kinetic pressure generating groove 50a may also be formed on a lower end of the rotary shaft 30 which faces the surface of the lower thrust bearing 50. The first kinetic pressure generating groove 50a has a spiral shaped groove having a predetermined area, extending from an edge portion of the lower thrust bearing 50 to its center portion. The spiral shaped groove is precisely formed by an etching process at a predetermined depth of several $\mu$m.

Meanwhile, an upper sleeve 20' is inserted into one side of an upper bearing bracket 10' in a hard disk and fixably fastened with the upper bearing bracket 10' by means of a clamp screw or the like. A through hole 25' is formed in the upper sleeve 20' and connected to an air vent 20a'. An upper thrust bearing 50' is inserted into the other side of the upper bearing bracket 10' and fixably fastened with the upper sleeve 20' by means of a clamp screw or the like. In the same manner as the first kinetic pressure generating groove 50a, a first kinetic pressure generating groove 50a' is formed on a surface of the upper thrust bearing 50' in such a manner that it extends from an edge portion of the upper thrust bearing 50' to its center portion with a spiral shaped groove having a predetermined area.

Both ends of the rotary shaft 30 are inserted into the through holes 25 and 25' of the sleeves 20 and 20'. Herring bone shaped second kinetic pressure generating grooves 30a and 30b are formed on a circumferential side of the rotary shaft 30 which is inserted into the respective through holes 25 and 25'. The second kinetic pressure generating grooves 30a and 30b have an angle of about 30° and a depth of the several $\mu$m relative to the horizontal direction of the rotary shaft 30.

A plate 60 in which a rotor (not shown) is mounted is fixed to a hub 70. A rotary disk 80 is mounted on the hub 70. The hub 70 is push fitted into the rotary shaft 30.

Furthermore, a working fluid such as a mineral oil or lubricant such as air is implanted into the lower and upper sleeves 20 and 20', the rotary shaft 30, and the lower and upper thrust bearings 50 and 50'. The air vents 20a and 20a' exhaust air between the rotary shaft 30 and the lower thrust bearings 50 and between the rotary shaft 30 and the upper thrust bearing 50' when the rotary shaft 30 is inserted into the lower and upper sleeves 20 and 20'. The air vents 20a and 20a' also prevent pressure from being varied due to expansion of the volume of air caused by variation of temperature of the respective members.

The operation of the fluid bearing apparatus according to the present invention in the case that the rotary shaft is laid in the vertical direction will be described below.

First, if the power source is applied to the rotor and stator (not shown), a plate 60 in which the rotor is mounted starts to rotate by electromagnetic action of the rotor and stator. The hub 70 fixed to the plate 60 and the rotary shaft 30 in which the hub 70 is push fitted rotate, as the plate 60 rotates.

At this time, the working fluid is implanted into the second kinetic pressure generating grooves 30a and 30b of the lower and upper thrust bearings 50 and 50' which face lower and upper end portions of the rotary shaft 30. At edge portions of the second kinetic pressure generating grooves 30a and 30b, the highest fluid pressure is formed so that the rotary shaft 30 can rotate without contacting with the lower and upper sleeves 20 and 20'.

Furthermore, the fluid is implanted into the first kinetic pressure generating grooves 50a and 50a' which face the lower and upper end portions of the rotary shaft 30. The first kinetic pressure generating groove 50a contacts with the rotary shaft 30 by load and tare of the shaft. The first kinetic pressure generating groove 50a' is separated from the rotary shaft 30 at a predetermined interval of several $\mu$m. Thus, the fluid pressure which pushes up the rotary shaft 30 by the first kinetic pressure generating groove 50a at the lower portion gets higher than that which pushes down the rotary shaft. 30 from the first kinetic pressure generating groove 50a' at the upper portion. As a result, the rotary shaft 30 is boosted from the first kinetic pressure generating groove 50a.

However, the fluid pressure which acts on the rotary shaft 30 from the first kinetic pressure generating groove 50a gradually gets lower as a separation clearance between the lower thrust bearing 50 and the rotary shaft 30 gets larger. On the other hand, the fluid pressure which acts between the rotary shaft 30 and the first kinetic pressure generating groove 50a' gradually gets higher as a separation clearance between the upper thrust bearing 50' and the rotary shaft 30 gets smaller. The fluid pressure which acts on the first kinetic pressure generating groove 50a balances with the fluid pressure which acts on the first kinetic pressure generating groove 50a' as the time elapses. As a result, the rotary shaft 30 can rotate without any movement or oscillation under the circumstances that it is separated from the sleeves 20 and 20' and the lower and upper thrust bearings 50 and 50'.

The operation of the fluid bearing apparatus according to the present invention in the case that the rotary shaft is laid in the horizontal direction will be described below.

When the rotary shaft 30 starts to rotate, the rotary shaft 30 may contact with any one of the lower and upper thrust bearings 50 and 50' or may not contact with any one of the bearing. The circumferential side at both ends of the rotary shaft 30 contacts with the sleeves 20 and 20'. Under the circumstances, if the power source is applied to the rotor and stator to rotate the rotary shaft 30, the circumferential side of the rotary shaft 30 is separated from the sleeves 20 and 20' by means of the fluid pressure produced by the second kinetic pressure generating grooves 30a and 30b to rotate without contacting with the sleeves 20 and 20'. In the case that the rotary shaft 30 contacts with any one of the lower and upper thrust bearings 50 and 50', the fluid pressure occurs in the same manner that the rotary shaft 30 is laid in the vertical direction. In the case that the rotary shaft 30 does not contact with any one of the lower and upper thrust bearings 50 and 50', the rotary shaft 30 repeats to push up and down by the fluid pressure which depends on the clearance between the rotary shaft 30 and the lower and upper thrust bearings 50 and 50'. When the clearance between the rotary shaft 30 and the lower thrust bearing 50 is the same as that between the rotary shaft 30 and the upper thrust bearing 50', the rotary shaft 30 can rotate without contacting with the lower and upper thrust bearings 50 and 50'.

The operation of the fluid bearing apparatus according to the present invention in the case that the rotary shaft is laid at a predetermined angle will be described below.

In this case, the circumferential side of the rotary shaft 30 contacts with the sleeve and at least one end portion of the rotary shaft contacts with the thrust bearing. Under the circumstances, if the rotary shaft starts to rotate, the aforementioned first and second operations repeat.

As aforementioned, the fluid bearing apparatus according to the present invention has the following advantages.

Since both end portions of the rotary shaft are rotatably supported by the sleeve, it is possible to prevent movement and oscillation of the rotary shaft caused by the load of the shaft even if the load direction of the rotary shaft is frequently varied. This improves performance of the product which requires high accuracy.

It will be apparent to those skilled in the art that various modifications and variations can be made in the fluid bearing apparatus according to the present invention without departing from the spirit or scope of the invention. For example, the fluid bearing apparatus which is applied to the hard disk according to the present invention may be applied to either a scanning motor in which a polygon mirror is mounted or a camcorder. Thus, it is intended that the present invention cover the modifications and variations of the invention provided they come within the scope of the appended claims and their equivalents.

What is claimed is:

1. A fluid bearing apparatus comprising:

a pair of sleeves mounted into a first side of a pair of bearing brackets;

a rotary shaft having two ends inserted into through holes of said pair of respective sleeves, having a second kinetic pressure generating groove on an external side of said rotary shaft which faces an internal side of the respective through holes of said pair of sleeves, wherein said rotary shaft rotates with respect to said sleeves mounted into said pair of bearing brackets so as to prevent movement and oscillation of said rotary shaft caused by a load of said rotary shaft during rotation;

a pair of thrust bearings including an upper and lower thrust bearing, mounted into a second side of said pair of bearing brackets, respectively, so that a thrust bearing is mounted at each of the two ends of said rotary shaft wherein clearances respectively exist between said rotary shaft and said lower thrust bearing and between said rotary shaft and said upper thrust bearing during rotation so that said rotary shaft avoids contact with said thrust bearings; and a first kinetic pressure generating groove formed between any one of said pair of thrust bearings and a face of one of the two ends of said rotary shaft.

2. The fluid bearing apparatus as claimed in claim 1, wherein said first kinetic pressure generating groove has a spiral shape of which area is reduced as an edge portion extends to a center portion.

3. The fluid bearing apparatus as claimed in claim 1, wherein said first kinetic pressure generating groove is formed on a surface of said pair of thrust bearings, facing one of the two ends of said rotary shaft.

4. The fluid bearing apparatus as claimed in claim 3, wherein said first kinetic pressure generating groove is formed at each of the surfaces of said pair of thrust bearings facing the two ends of said rotary shaft.

5. The fluid bearing apparatus as claimed in claim 1, wherein said first kinetic pressure generating groove is formed in the face of one of the two ends of said rotary shaft.

6. The fluid bearing apparatus as claimed in claim 1, wherein said first kinetic pressure generating groove is formed in the faces of the two ends of said rotary shaft.

7. The fluid bearing apparatus as claimed in claim 1, wherein said second kinetic pressure generating groove is formed at a external side of both ends of said rotary shaft which is inserted into said pair of sleeves.

* * * * *